(12) United States Patent
Agarwal et al.

(10) Patent No.: US 11,403,154 B1
(45) Date of Patent: Aug. 2, 2022

(54) SYSTEMS, METHODS AND APPARATUSES FOR RUNNING MULTIPLE MACHINE LEARNING MODELS ON AN EDGE DEVICE

(71) Applicant: Amazon Technologies, Inc., Seattle, WA (US)

(72) Inventors: Vinayak Ashutosh Agarwal, Newark, CA (US); Jason Lenox Copeland, Mountain View, CA (US); Alexei Shlychkov, Castro Valley, CA (US); Naga Krishna Teja Komma, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 378 days.

(21) Appl. No.: 16/587,402

(22) Filed: Sep. 30, 2019

(51) Int. Cl.
*G06F 9/54* (2006.01)
*G06F 9/50* (2006.01)
*G06F 8/60* (2018.01)
*G06F 9/455* (2018.01)
(Continued)

(52) U.S. Cl.
CPC .............. *G06F 9/546* (2013.01); *G06F 8/60* (2013.01); *G06F 9/5005* (2013.01); *G06F 9/54* (2013.01); *G06F 9/542* (2013.01); *G06F 9/544* (2013.01); *G06F 5/06* (2013.01); *G06F 9/45558* (2013.01); *G06F 2009/4557* (2013.01); *G06F 2209/5011* (2013.01); *G06N 20/00* (2019.01)

(58) Field of Classification Search
None
See application file for complete search history.

(56) References Cited

U.S. PATENT DOCUMENTS

| 7,152,231 | B1 | 12/2006 | Galluscio et al. |
| 8,336,050 | B2 | 12/2012 | Dake |
| 9,274,861 | B1 | 3/2016 | Karppanen |

(Continued)

OTHER PUBLICATIONS

Final Office Action, U.S. Appl. No. 16/587,395, dated May 11, 2021, 21 pages.

(Continued)

*Primary Examiner* — Qing Yuan Wu
(74) *Attorney, Agent, or Firm* — Nicholson De Vos Webster & Elliott, LLP

(57) ABSTRACT

Techniques for implementing an on-demand serverless compute system that uses shared memory to share data between on-demand serverless compute applications are described. In some examples, a daemon of an edge device providing on-demand serverless compute is to: register launched one or more launched on-demand serverless applications, read a deployment configuration for an application using the one or more launched on-demand serverless applications, per the read deployment configuration, launch at least one data source and at least one data sink, per launched data source, register the launched data source with the device daemon, per launched data sink, register the launched data sink thread with the device daemon, match registered, launched data sources with registered, launched data sinks and launched on-demand serverless applications as defined in the deployment configuration, and for each match, register a connection first in, first out structure to be used to share data on an event driven basis between launched on-demand serverless applications.

20 Claims, 17 Drawing Sheets

(51) Int. Cl.
 *G06F 5/06* (2006.01)
 *G06N 20/00* (2019.01)

(56) References Cited

U.S. PATENT DOCUMENTS

| | | |
|---|---|---|
| 2006/0053267 A1 | 3/2006 | McDonald et al. |
| 2007/0118700 A1 | 5/2007 | Mensching et al. |
| 2010/0306479 A1 | 12/2010 | Ezzat |
| 2012/0089992 A1 | 4/2012 | Reeves et al. |
| 2013/0117761 A1 | 5/2013 | Archer et al. |
| 2013/0117764 A1* | 5/2013 | Archer .................. G06F 9/544 |
| | | 719/314 |
| 2015/0134765 A1 | 5/2015 | Holmberg et al. |
| 2015/0227736 A1 | 8/2015 | Guo et al. |
| 2015/0254116 A1 | 9/2015 | Kim et al. |
| 2017/0351467 A1 | 12/2017 | Wakabayashi |
| 2020/0104196 A1 | 4/2020 | Ritchie et al. |
| 2020/0226009 A1* | 7/2020 | Bachmutsky ............. G06F 8/44 |

OTHER PUBLICATIONS

Notice of Allowance, U.S. Appl. No. 16/587,395, dated Nov. 4, 2021, 10 pages.
Non-Final Office Action for U.S. Appl. No. 16/587,395, dated Nov. 23, 2020, 20 pages.

\* cited by examiner

```
IMPORT RUNTIME

CLASS SAMPLE(TASK.FUNCTION):

DEF INTERFACE(SELF):
        RETURN {
            # ...
        }

DEF INIT(SELF, PARAMETERS, INPUTS, OUTPUTS):
        # ...

DEF ENTRY(SELF, INPUTS, OUTPUTS):
        # ...

DEF MAIN():
    RETURN SAMPLE().RUN()
```

*FIG. 8*

```
{
  "PARAMETERS":
  (
    (<TYPE_NAME>, <VARIABLE_NAME>, <DESCRIPTION>, [DEFAULT_VALUE]),
    ...
  ),
  "INPUTS":
  (
    (<TYPE_NAME>, <VARIABLE_NAME>, <REQUIRED>, <DESCRIPTION>),
    ...
  ),
  "OUTPUTS":
  (
    (<TYPE_NAME>, <VARIABLE_NAME>, <DESCRIPTION>),
    ...
  )
}
```

FIG. 9

```
{
    "NAME": "PACKAGE:SAMPLE-APPLICATION",
    "PACKAGE":
[

{
  "TASKNAME": "FUNCTION:LAMBDA-FUNCTION-NAME",
  "PARAMETERS":
  [
    {
      "NAME": "FRONT_CROP",
      "VALUE": [ [0, 0, 0.2, 0.3], [0, 0, 0.2, 0.3], [0, 0, 0.2, 0.3] ]
    },
    {
      "NAME": "PEOPLE_DETECTION_MODEL",
      "VALUE": "PEOPLE_DETECTION_MODEL_DIRECTORY"
    }

],
  "INPUTS":
  [
    {
      "NAME": "PEOPLE-COUNT",
      "SOURCE":
      [
        "FUNCTION:PEOPLE-COUNTER:COUNT"
      ]
    },
    {
      "NAME": "FRIES-COUNT",
      "SOURCE":
      [
        "FUNCTION:FRIES-COUNTER-1:COUNT",
        "FUNCTION:FRIES-COUNTER-2:COUNT[0:1]",
      ]
    }

```
{
  "ARN": "APPLICATION:SAMPLE-APPLICATION",
  "APPLICATION":
  [
    {
      "RESOURCENAME": "SINK:FRIES-ORDER",
      "PARAMETERS":
      [
        {
          "NAME": "TYPE",
          "VALUE": "MQTT"
        },
        {
          "NAME": "TOPIC",
          "VALUE": "FRIES-ORDER-TOPIC"
        },
      ],
      "INPUTS":
      [
        {
          "NAME": "DATA",
          "REQUIRED": "TRUE",
          "SOURCE":
          [
            "FUNCTION:FRIES-ORDER_MASTER:COUNT"
          ]
        }
      ]
    }
  ]
}
```

FIG. 11

```
IMPORT TASK RUNTIME

CLASS FACE_RECOGNITION(TASK.FUNCTION):
  DEF INTERFACE(SELF):
    RETURN {
      "PARAMETERS":
      (
        ("UINT32", "FACE_BOX_BATCH_SIZE",
            "AVERAGE INFERENCE BATCH SIZE",
            5),
        ("MODEL", "FACE_DETECTION_MODEL",
            "MODEL FOR FACE DETECTION",
            "FACE_DETECTION_MODEL"),
        ("MODEL", "LANDMARK_MODEL",
            "MODEL FOR FACE LANDMARK DETECTION",
            "LANDMARK_MODEL"),
        ("MODEL", "FACE_EMBEDDING_MODEL",
            "MODEL FOR FACE EMBEDDING DETECTION",
            "FACE_EMBEDDING_MODEL")
      ),
      "INPUT":
      (
        ("MEDIA[]", "VIDEO", TRUE,
              "VIDEO FEED INPUT TO BE ANALYZED")
      ),
      "OUTPUT":
      (
        ("DATA[VIDEO][]", "EMBEDDING",
              "FACE EMBEDDINGS PER VIDEO STREAM"),
      )
    }

DEF INIT(SELF, CONFIG, INPUTS, OUTPUTS):
    # LOAD MODELS FROM SPECIFIED DIRECTORIES,
    # ALLOCATE ALL LAYERS ACCORDINGLY TO THE BATCH SIZE.
    SELF.DETECT = TASK.MODEL(CONFIG.FACE_DETECTION_MODEL,
              BATCH_SIZE=LEN(INPUTS.VIDEO))
    SELF.LANDMARK = TASK.MODEL(CONFIG.LANDMARK_MODEL,
              BATCH_SIZE=CONFIG.FACE_BOX_BATCH_SIZE)
    SELF.EMBEDDING = TASK.MODEL(CONFIG.FACE_EMBEDDING_MODEL,
              BATCH_SIZE=CONFIG.FACE_BOX_BATCH_SIZE)

# GET REFERENCES TO THE INPUT AND OUTPUT BATCH ARRAYS.
    # EACH OF THE OBJECTS HERE REPRESENT AN ARRAY THE SIZE OF THE BATCH.
    SELF.DETECT_DATA = SELF.DETECT["DATA"]
    SELF.DETECT_OUT = SELF.DETECT["OUT"]

SELF.LANDMARK_IN = SELF.LANDMARK.INPUTS[0]
    SELF.LANDMARK_OUT = SELF.LANDMARK.OUTPUTS[0]

SELF.EMBED_IN = SELF.EMBEDDING["IN"]
    SELF.EMBED_OUT = SELF.EMBEDDING["OUT"]

# SET OPTIONAL HANDLERS TO BE CALLED AFTER THE MODEL IS EXECUTED.
    SELF.DETECT.SET_HANDLER(SELF.PROCESS_DETECT_RESULTS)
    SELF.LANDMARK.SET_HANDLER(SELF.PROCESS_LANDMARK_POINTS)
    SELF.EMBEDDING.SET_HANDLER(SELF.PROCESS_EMBEDDINGS)
    ...
```

*FIG. 12*

```
DEF ENTRY(SELF, INPUTS, OUTPUTS):
  # THE LIST HOLDS REFERENCES TO THE EMBEDDING RESULT OBJECTS
  # CORRESPONDING TO THE PROCESSED INPUTS.
  SELF.EMBED_LIST = LIST()

# BATCH ALL PROVIDED INPUTS FOR FACE DETECTION.
  FOR VIDEO_INDEX, VIDEO IN ENUMERATE(INPUTS.VIDEO):
    # IF THE IMAGE IS EMPTY, SKIP.
    IMAGE = VIDEO.IMAGE
    IF IMAGE.DATA IS NONE:
      OUTPUTS.EMBEDDING[VIDEO_INDEX].CLEAR()
      CONTINUE

SELF.EMBED_LIST.APPEND(OUTPUTS.EMBEDDING[VIDEO_INDEX])

# ADD THE IMAGE TO THE BATCH.
    # THE OPERATION WILL DO THE FOLLOWING:
    # - PERFORM SCALING AS NEEDED FROM IMAGE.DATA --> DETECT_DATA
    # - NORMALIZE IMAGE AS DEFINED BY THE LAYER CONFIGURATION
    # - EXECUTE THE BATCH AND WAIT FOR COMPLETION IF THIS IS THE
    #   LAST BUFFER OF THE BATCH
    # - RETURN THE NUMBER OF EXECUTED BUFFERS OR 0,
    #   IF NO BUFFERS WERE EXECUTED
    SELF.DETECT_DATA.BATCH(IMAGE.DATA, NORMALIZE=TRUE, FINISH=TRUE)

# EXECUTE THE BATCH IF NOT EXECUTED YET.
  SELF.DETECT.FINISH()
```

*FIG. 13*

```
DEF PROCESS_DETECT_RESULTS(SELF):
    SELF.PROCESSED_FACES = LIST()

FOR DETECT_INDEX, EMBEDDING IN ENUMERATE(SELF.EMBED_LIST):
        # GET THE LIST OF FACE BOXES FOR THE CURRENT VIDEO.
        FACE_BOXES = SELF.VALIDATE_RECTS(SELF.DETECT_OUT[DETECT_INDEX])
        IF NOT FACE_BOXES:
            CONTINUE

FOR FACE_BOX IN FACE_BOXES:
            SELF.PROCESSED_FACES.APPEND(EMBEDDING)
            SELF.LANDMARK_IN.BATCH(SELF.DETECT_DATA[DETECT_INDEX],
                    CROP_RECT=FACE_BOX, FINISH=TRUE)

# EXECUTE THE BATCH IF NOT EXECUTED YET.
    SELF.LANDMARK.FINISH()
    SELF.EMBED_LIST.CLEAR()

DEF PROCESS_LANDMARK_POINTS(SELF):
    SELF.PROCESSED_LANDMARKS = LIST()

FOR LANDMARK_INDEX, EMBEDDING IN ENUMERATE(SELF.PROCESSED_FACES):
        SELF.PROCESSED_LANDMARKS.APPEND(EMBEDDING)
        SELF.EMBED_IN.BATCH(LANDMARK_IN[LANDMARK_INDEX],
                ALIGN=SELF.LANDMARK_OUT[LANDMARK_INDEX],
                FINISH=TRUE)

SELF.EMBED.FINISH()
    SELF.PROCESSED_FACES.CLEAR()

DEF PROCESS_EMBEDDINGS(SELF):
    FOR EMBEDDING_INDEX, EMBEDDING IN ENUMERATE(SELF.PROCESSED_LANDMARKS):
        EMBEDDING.APPEND(SELF.EMBED_OUT[EMBEDDING_INDEX])
    SELF.PROCESSED_LANDMARKS.CLEAR()

DEF VALIDATE_RECTS(SELF, RAW_BOXES):
    # CONVERT DETECTED FACE BOUNDING BOXES FROM RAW BUFFER INTO RECTS.
    RETURN LIST()

DEF MAIN():
    RETURN FACE_RECOGNITION().RUN()
```

*FIG. 14*

SYSTEMS, METHODS AND APPARATUSES FOR RUNNING MULTIPLE MACHINE LEARNING MODELS ON AN EDGE DEVICE

BACKGROUND

Building production-ready machine learning (ML) models and improving them over time is a time-consuming process for businesses today as there are many undifferentiated intermediate steps, which are technically involved and thus require input from data scientists.

BRIEF DESCRIPTION OF DRAWINGS

Various embodiments in accordance with the present disclosure will be described with reference to the drawings, in which:

FIG. 8 illustrates an example of a task according to some embodiments.

FIG. 9 illustrates embodiments of the dictionary return of from the interface( ) function.

FIG. 10 illustrates an example of a package definition.

FIG. 11 illustrates an example of an application definition.

FIGS. 12-14 illustrate aspects of an exemplary task code.

DETAILED DESCRIPTION

Figure 1:
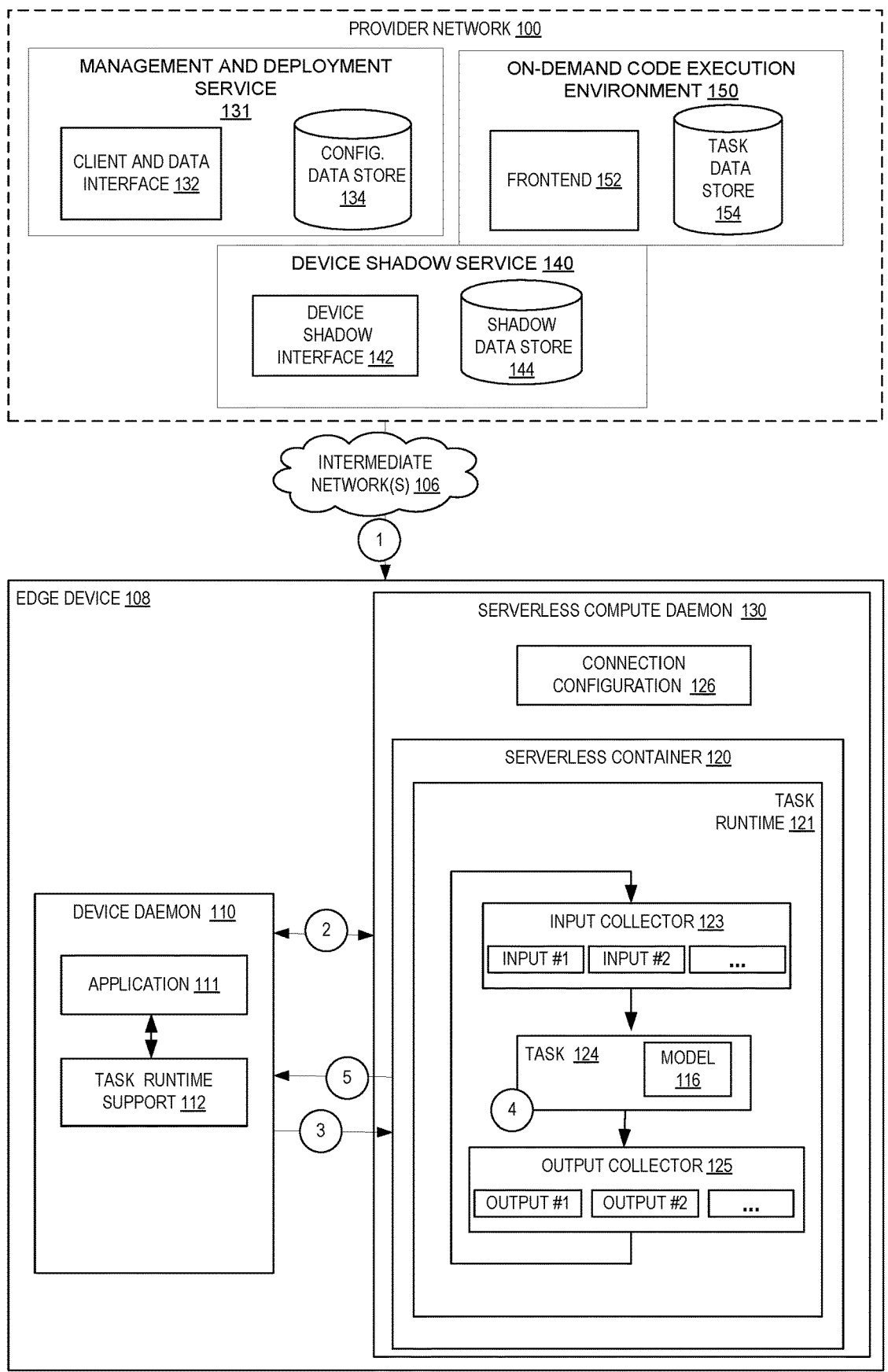
FIG. 1 illustrates embodiments of a system capable of executing serverless tasks in an edge device where the tasks may share data.

The present disclosure relates to methods, apparatus, systems, and non-transitory computer-readable storage media for running multiple models in parallel or sequentially. Additionally, methods, apparatus, systems, and non-transitory computer-readable storage media of using shared memory for inter process communication (whether or not applied to the running of multiple models) are described.

On-demand serverless computing allows for an edge device to execute program code without continually dedicating hardware resources for that program. In some embodiments, a provider network based on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (such as a "task" or "on-demand serverless application"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

Aspects of the present disclosure relate to localized on-demand code execution system, enabling rapid execution of portable segments of code to implement functions on the coordinator. These portable segments of code may be referred to herein as "tasks" or "on-demand serverless applications." Depending on the particular task algorithm, it may or may not have inputs and/or outputs. Tasks can be deployed to an edge device to execute some custom algorithm at the edge, for example, running a machine learning (ML) inference on incoming sensor data.

A potential drawback to localized or provider network based on-demand task/on-demand serverless application execution is the inability to run multiple task-based machine learning (ML) models at the same time easily that share data between them. In prior approaches, sharing data was accomplished by hardcoding connections between functions. This is slow and does not allow for large data sizes to be shared efficiently. Detailed herein are embodiments allowing such execution and the general usage of using shared memory for inter-process communications.

FIG. 1 illustrates embodiments of a system capable of executing serverless tasks in an edge device where the tasks may share data. For example, in various embodiments, a "serverless" function may include code provided by a user or other entity—such as the provider network itself—that can be executed on demand. In this example, serverless tasks are maintained within an edge device 108 for an on-demand code execution upon being called by an application 111. A serverless function may be executed by a compute instance, such as a virtual machine, container, etc., when triggered or invoked. In some embodiments, a serverless function can be invoked through an application programming interface (API) call. Accordingly, users can define serverless functions that can be executed on demand, without requiring the user to maintain dedicated infrastructure to execute the serverless function. In some embodiments, these resources may be maintained in a "ready" state (e.g., having a pre-initialized runtime environment configured to execute the serverless functions), allowing the serverless functions to be executed in near real-time.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

To support local "serverless" computing, the provider network 100 may include a management and deployment service 131 to enable registration applications, etc. with the service provider environment 100 and configuration of such, a device shadow service 140 to enable robust changes to state of applications, daemons, etc., and an on-demand code execution environment 150 providing on-demand, dynamic execution of tasks, as well as deployment and provisioning of tasks edge devices.

In some embodiments, the management and deployment service 131 includes a client and data interface 132 and a configuration data store 134 that may operate collectively to enable registration of an edge device 108 with the management and deployment service 131, generation of configurations, and transmission of configuration data to the edge device 108. Illustratively, the client and data interface 132 may provide one or more user interfaces (e.g., APIs, CLIs, GUIs, etc.) through which a user, via a client device, may generate or submit a configuration for storage in the configuration data store 134. The client and data interface 132 may further provide one or more interfaces through the edge device 108 may obtain the configuration, such that the edge device 108 is reconfigured according to the obtained configuration. The configuration data store 134 can correspond to any persistent or substantially persistent data store, such as a hard drive (HDD), a solid state drive (SDD), network attached storage (NAS), a tape drive, or any combination thereof.

The device shadow service 140 can include elements enabling a "shadow state" of a device, such as the edge device 108, to be created, maintained, read, altered, or deleted. As discussed above, a shadow state may correspond to data representing a desired state of a correspond device, which may or may not mirror a current state of the device. For example, with respect to the edge device 108, a shadow state may include a desired configuration version for the edge device 108. With respect to the edge device 108, a shadow state may include a desired state of a coordinated device (e.g., on or off for a switch or bulb, locked or unlocked for a lock, a desired temperature for a thermostat, etc.). The device shadow service 140 may enable users, via client devices, or other entities to read from or modify a shadow state for a device and may further interact with that device to synchronize the device to the shadow state. Illustratively, the device shadow service 140 may include an interface 142 (which may include, e.g., APIs, CLIs, GUIs, etc.) through which requests to read from, write to, create or delete a shadow state may be received, as well as a shadow data store 144 configured to store the shadow states. The shadow data store 144 can correspond to any persistent or substantially persistent data store, such as a hard drive (HDD), a solid state drive (SDD), network attached storage (NAS), a tape drive, or any combination thereof.

The on-demand code execution environment 150 can include a number of devices providing on-demand execution of tasks (e.g., portable code segments). Specifically, the on-demand code execution environment 150 can include a frontend 152, through which users, via a client device, may submit tasks to the on-demand code execution environment 150 and call for execution of tasks on the on-demand code execution environment 150. Such tasks may be stored, for example, in a task data store 154, which can correspond to any persistent or substantially persistent data store, such as a hard drive (HDD), a solid state drive (SDD), network attached storage (NAS), a tape drive, or any combination thereof. While not shown in FIG. 1, the on-demand code execution system 150 can include a variety of additional components to enable execution of tasks, such as a number of execution environments (e.g., containers or virtual machines executing on physical host devices of the on-demand code execution environment 150), a worker manager to manage such execution environments, and a warming pool manager to assist in making execution environments available to the worker manager on a rapid basis (e.g., under 10 ms).

As noted above, tasks may be utilized both at the on-demand code execution environment 150 and at the edge device 108. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 150 or the edge device 108 in a variety of manners. In one embodiment, a client device or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of the edge device 108, an network-accessible storage service, or the task data store 154) prior to the request being received by the edge device 108 or the on-demand code execution system 150. A request interface of the edge device 108 or the on-demand code execution system 150 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to a request interface.

A call to execute a task may specify one or more third-party libraries (including native libraries) to be used along with the user code corresponding to the task. In one embodiment, the call may provide to the edge device 108 or the on-demand code execution system 150 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the edge device 108 or the on-demand code execution system 150 (e.g., standard routines), and/or provided by third parties. In some embodiments, such resource-level constraints (e.g., how much memory is to be allocated for executing a particular user code) are specified for the particular task and may not vary over each execution of the task.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the edge device 108 or the on-demand code execution system 150 may inspect the call and look for the flag or the header, and if it is present, the edge device 108 or the on-demand code execution system 150 may modify the behavior (e.g., logging facilities) of the execution environment in which the task is executed, and cause the output data to be provided back to the user. In some embodiments, the behavior/mode indicators are added to the call by the user interface provided to the user by the edge device 108 or the on-demand code execution system 150. Other features such as source code profiling, remote debugging, etc. may also be enabled or disabled based on the indication provided in a call.

As shown, the edge device 108 includes a device daemon 110 and one or more serverless containers 120. The device daemon 110 acts as a data processing pipeline, for example, with frames of data flowing from top to bottom. Running tasks independently from each other in separate processes allows for parallel execution of different data frames at the same time. Event driven FIFOs (first in, first out) detailed below are used for each of the task connections to reference the data and to allow simultaneous task execution. In some embodiments, hardware acceleration is used where possible to execute a task to ensure maximum efficiency for inference execution, video decoding/encoding, color conversion, scaling, etc.

The device daemon 110 performs one or more of: application initialization and teardown during deployment and startup, provides and ensures application control-flow and data-flow; task runtime support 112 to remotely call hardware-accelerated inference, image processing and utilities, and provide data sources and sinks.

In some embodiments, an application 111 is deployed in the device daemon 110 and that application utilizes one or more tasks 124. In some embodiments, the application 111 is a package or a set of packages that are configured and ready for deployment to a device or a set of devices. A package is a reusable building block that defines a certain function, which can be implemented by one or more tasks working together. Packages can be stored in a marketplace and used to define a deployable application or can be created from scratch during deployment definition. Packages define references to relevant artifacts such as tasks, Models, label files, etc. Packages also define relationships between tasks. In some embodiments, a package consists of the following: task functions, artifacts that the tasks require (models, label files, etc.), a configuration that defines the relationship between tasks in the package. Once a package's tasks are defined, data sources and sinks are specified as needed to complete the application.

Depending on the application, one or more tasks 124 are able to get access to various input data streams, perform transformations on the data received as necessary and produce results that can be stored, used for analysis or streamed to other destinations. Each of the tasks 124 in the application 111 is run independent of the others in its own process (serverless container 120). The underlying task runtime 121 performs inter-task synchronization and data exchange and executes the task code 124 when input data is available making the tasks 124 a run on event-driven basis.

In some embodiments, each task utilizes a set of basic functionalities to be able to execute which is supplied by the task runtime 121. This set includes one or more of: an ability to connect its inputs to data sources; an ability to announce and provide its outputs to the consumers; an ability to wait for and act upon the incoming data; an ability to collect produced results and provide them to the consumers; and an ability to manipulate images, load models, run inference, etc.

As noted above, a task 124 may run a ML model 116 (here a ML model includes the model and associated artifacts) and is a resource consumed by the task 124. In some embodiments, each model is placed in its own directory, and the name of the directory is used to refer to the model from within the task code. The model directories contain a configuration file that provides details describing this particular model. This configuration effectively creates a wrapper for the model within and allows to have a uniform task API for model loading regardless of the model's architecture.

Tasks may have data sources and/or data sinks. Exemplary data sources include, but are not limited to: ONVIF/RTSP (e.g., a media stream from IP cameras), HTTP sensors (e.g., data stream from a sensor on the network), Message Queueing Telemetry Transport (MQTT) (e.g., a MQTT data stream), a database, etc. Data sinks receive data from other tasks, perform data conversions as necessary, and deliver the data to a final consumer, internal or external to the edge device. Examples of data sinks include but are not limited to: ONVIF/RTSP output streams, WebRTC, MQTT, a database, and other storage. In some embodiments, a main loop of the task 124 utilizes an input collector 123 to collect source data to provide to a model 116 of the task 124 and then utilizes an output collector 125 for data sinks.

In some embodiments, an on-demand serverless compute daemon 130 performs one or more functions such as: task 124 deployment, the maintaining of the credentials for cloud access from the edge device 108, and after tasks 124 are deployed to the device 108, launches them each inside its own container 120. The container 120 may act as a protective sandbox.

The circles with numbers in them illustrate an exemplary flow of operations. At circle 1, the provider network 100 deploys an application having one or more tasks to the edge device 108. The application 111 is initialized at circles 2 and 3 using the device daemon 110 and the on-demand serverless compute daemon 130 including using connection configuration information 126 from the deployment package. An exemplary initialization is described in more detail with respect to FIG. 2.

Once the application 111 has been initialized, it can execute. During execution of the application 111, it will call one or more tasks 124 using the task runtime support at circle 3. At circle 4, the task 124 will executed (for example use model 116) using data collected by input collector 123 and one or more results are output to output collector 125.

Figure 2:
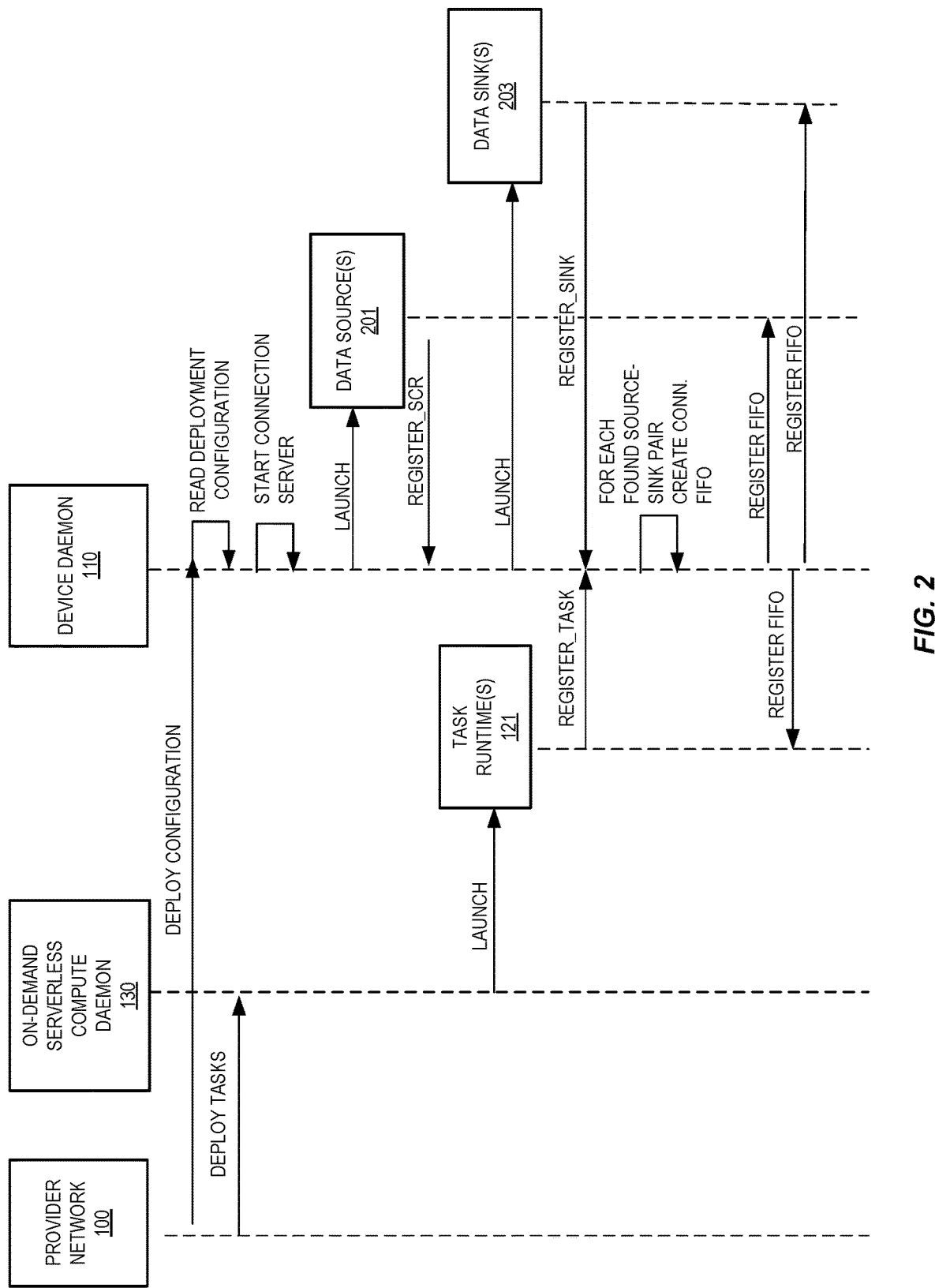
FIG. 2 illustrates embodiments of a flow for initializing an application on an edge device that utilizes tasks that share data.

FIG. 2 illustrates embodiments of a flow for initializing an application on an edge device that utilizes tasks that share data. The provider network 100 deploys tasks for the application to the serverless compute daemon and a configuration file (part of the package detailed above) to the device daemon 110.

The on-demand serverless compute daemon 130 launches (starts) the tasks by allocating a container and task runtime 121 for each of the tasks. As such, each task is separately containerized and provided with the functionality (e.g., libraries) it needs to operate the ML model(s) for the task, etc.

The configuration is read by the device daemon 110 and a connection server (with the on-demand serverless compute daemon 130) is established. Any additional artifacts are deployed using the device daemon 110 too. The device daemon 110 also launches data sources 201 and data sinks 203 as dictated by the application configuration. The connection server allows for data source(s) 201 and data sink(s) to communicate with the task runtime(s) 121. In some embodiments, the connection server is a part of the task runtime support 112. Note that sources and sinks are optional and may not be present.

Each launched data source 201, when ready, registers itself with the device daemon 110 by sending its identifier, associated outputs and output parameters. Each launched data sink 203 is registered similarly. In some embodiments, the data sinks 203 are placed into a connection queue to wait until the necessary input connections are available.

Each launched task, similar to data sinks and sources, registers itself with the device daemon and, in some embodiments, is placed in the connection queue.

The device daemon 110 matches registered data sources 201 with data sinks 203 and tasks in the connection queue based on the connections defined by the application configuration. As the connection matches found, a connection first in, first out (FIFO) data structure is created for each of the connections and the information is passed to the sinks, sources, and tasks to establish the connection. In some embodiments, a connection FIFO data structure provides the ability to share data with zero copy on event-driven basis between two separate processes. In some embodiments, matches are found using resource names for the sources, sinks, and tasks.

In some embodiments, tasks can act both as data sinks (for its inputs) and data sources (for its outputs) and as respective tasks receive input connection information and the outputs become defined, each task will announce its outputs to the device daemon 110 the same way as data sources 201 as discussed above.

Figure 3:
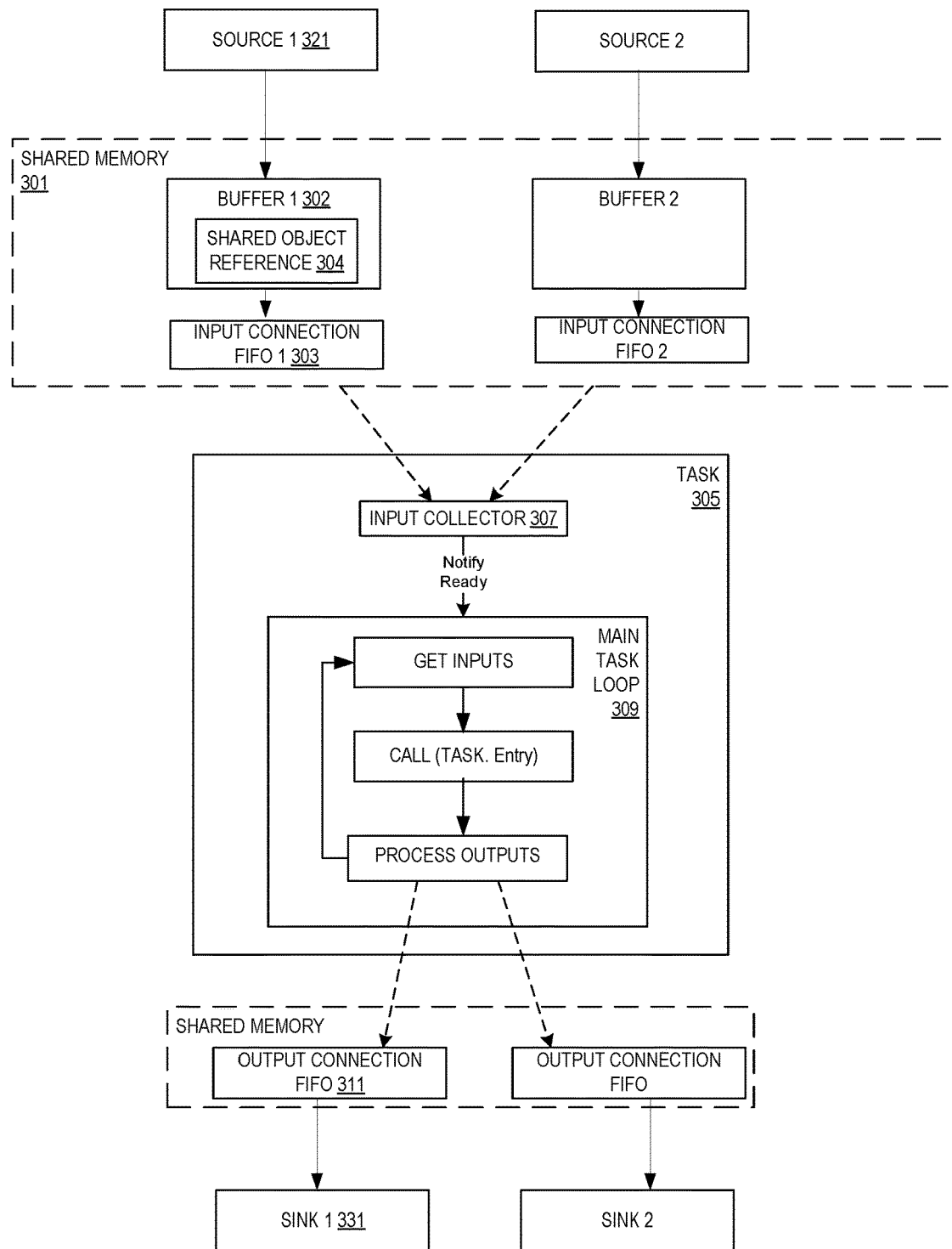
FIG. 3 illustrates embodiments of using connection FIFOs with task execution.

FIG. 3 illustrates embodiments of using connection FIFOs with task execution. As shown, one or more input connection FIFOs 303 feed a task 305. These input connection FIFOs collect data from a particular source 321. In some embodiments, the input connection FIFOs 303 are stored in shared memory 301. Shared memory 301 allows for the share these data structures between the device daemon 110 and tasks (such as task 305). The data sources (e.g., source 1 321), sinks (e.g., sink 1 331), and tasks can allocate memory for their respective use and make that allocated memory available to other authorized sources, sinks, and/or tasks. As such, even though a container is used for a task, the use of shared memory allows for data to be accessible across container boundaries. Note that multiple applications may be running on an edge device and, as such, memory allocated to be shared by tasks of a particular application is marked as being in accessible to other applications. In some instances, security for the shared memory provided through the usage of a secure enclave and/or using group ID and user ID restrictions.

An input collector thread 307 determines if there is enough data in the input connection FIFOs 303 to wake up a main loop 309 of the task 305. This could be done using one or more of: an indication an amount of data (as in is the buffer full or close to full) per buffer (such as buffer 1 302), a rate at which data is coming in (as in will the buffer overfull if the data is not handled), a priority of the data, etc. A buffer may include a shared object reference (such as shared object reference 304) and/or shared object.

The main task loop 309 will get the inputs from the input collector 307 and perform the task (e.g., call a model, etc.) and process the outputs to make them ready for consumption by one or more output connection FIFOs 311. Note that an output connection FIFO for one task may be an input connection FIFO for another task, and vice versa.

Figure 4:
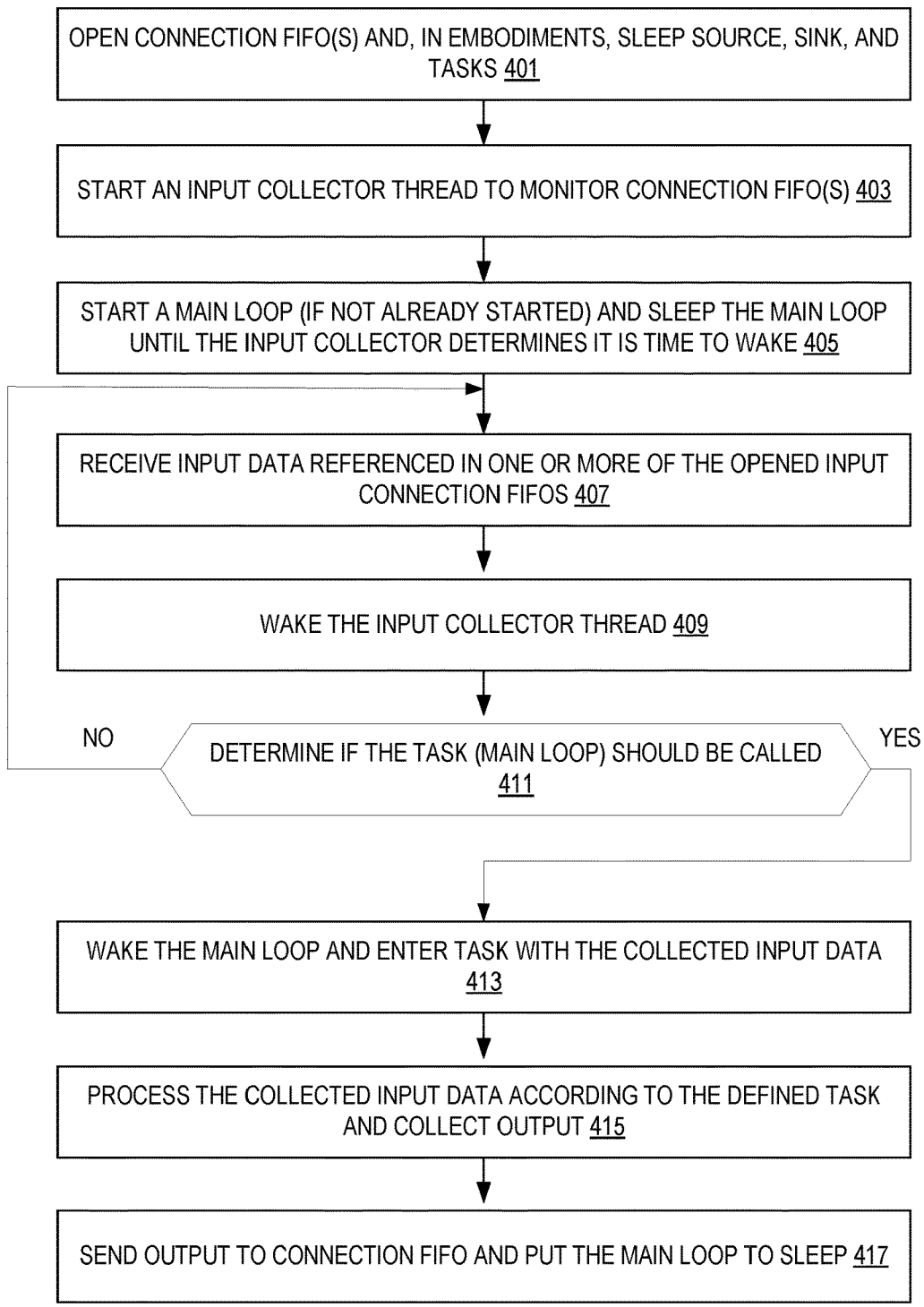
FIG. 4 is a flow diagram illustrating operations of a method for executing an application task using shared memory according to some embodiments.

FIG. 4 is a flow diagram illustrating operations of a method for executing an application task using shared memory according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by a serverless container 120 including a task 124 of the other figures.

At 401, input connection FIFOs for the source(s) (input for the task) and output connection FIFOs for sink(s) (output for the task) of the application task are opened. Additionally, in some embodiments, the sources and sinks are put into a sleep state. These will remain in this sleep state until there is incoming data (either input data for the task or data to be output from the task). Note the sources and sinks have been registered and associated with a task as noted above. Additionally, in some embodiments, connection FIFOs do not store data, but store references to data in shared memory.

An input collector thread to monitor the opened connection FIFO(s) is started at 403. The input collector thread decides when data collected by the input connection FIFOs is sufficient to start the main task code for input processing. What may constitute as "sufficient" has been detailed above.

At 405, the main loop of the task is started (if not already started) and, in some embodiments, is put to until the input collector determines it is time to wake up. Note that sleeping the main loop is in line with the "on-demand" nature of serverless computing whereas the connection FIFOs may be a departure from typical on-demand principles.

At 407, an input data reference is received in one or more of the opened input connection FIFOs. For example, output from a previous task is received, or data from a streaming device, etc.

The input collector thread is woken up at 409. Typically, the input connection FIFO(s) alert the input collector thread about received data. In some embodiments, a threshold amount of data is to be received before this happens instead of at each arrival of data.

The awake input collector thread determines if the task (main loop) should be called at 411. For example, is there enough, or the proper data, to run the task. If not, then the input collector thread waits for more data to arrive. If so, then, the input collector thread signals the main loop to wake up and it starts processing at 413. In some embodiments, a task entry function is called with the current set of input data.

The collected input data is processed according to the defined task and collect output at 415. For example, a one or more models are applied to the data.

After the processing, the output is sent to one or more output connection FIFOs (as configured) and, in some embodiments, the main loop is put to sleep at 417.

Figure 5:
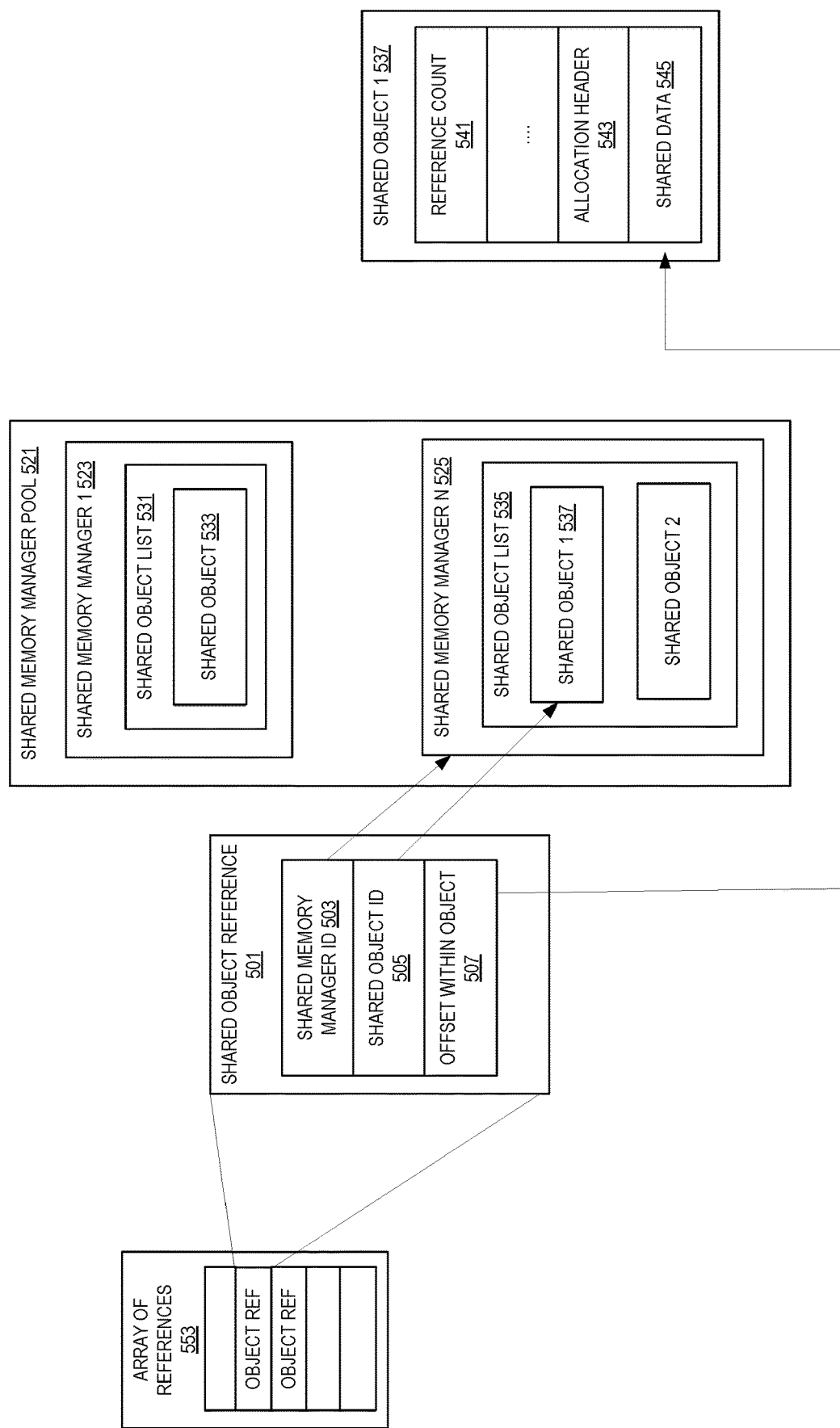
FIG. 5 illustrates embodiments of shared memory usage.

FIG. 5 illustrates embodiments of shared memory usage. As noted above, shared memory may be used for inter-task communication, etc. Further, shared memory may mean a combination of various types of storage such as cache, RAM, disk, etc. Note the management of shared memory is the purview of the device daemon 101 in some embodiments.

As shown, there may be a plurality of shared memory managers (shown as shared memory manager 1 523 and shared memory manager N 525). Each of the shared memory mangers (here 523 and 525) manage shared memory allocations including FIFOs and shared data objects. In some embodiments, this is accomplished by the maintaining of a shared object list 531 or 535 which notes all shared objects (such as shared object 533, shared object 1 537, and shared object 2) that a particular manager is responsible for. The shared memory managers are shared with the rest of the system so that data sources/data sinks/tasks may also make allocations and be able to access memory allocated by other parts of the system. The management of shared data objects may include populating a shared data object with data, etc.

A pool of shared memory managers 521 maintains a listing of the shared memory managers and provides a means to get access to a particular shared memory manager via its index. The pool and managers are allocated in each process's memory space (such as task's memory space).

A particular shared object is referenced via a shared object reference such as the exemplary shared object reference 501. In some embodiments, a shared object reference has at least three parts: a shared memory manager identifier 503 which references a particular shared memory manager, a shared object identifier 505 which references an object maintained by the identified shared memory manager, and an offset within the shared object 507. Shared object references are passed between processes as a pointer to shared data. Note that a shared object may have more than one piece of shared data and the offset allows for discriminating between these pieces of data.

Shared objects, such as shared object 1 537, are system resources and each of the processes owns a reference to them. Shared objects include a reference count 541 (noting how many processes use the object (reference it), when none do a shared memory manager 525 that populated the reference count 541 can de-allocate the shared object and/or free up the buffer space the object occupies), an allocation header 543, and shared data 545. The allocation header includes a reference counter, offset, and size of the buffer and references to adjacent buffers. The allocation header has also a provision to set a reference to a buffer pool in which this buffer will be placed when reference count runs to zero. The reference count determines a number of buffers that reference the object. Once the count is zero, the buffer can stay as is and wait to be allocated, be merged with sibling buffers, and/or be placed in a buffer pool for later allocation. Note that shared objects are normally freed when an entire application (including all processes) are shutting down.

Shared object references are stored in various FIFO data structures (such as a connection FIFO). In some embodiments, a buffer pool allows for a set of pre-allocated buffers (locations) to be ready for reuse. Shared memory buffers are associated with a pool at allocation and are placed back into the pool when their reference count goes to zero.

During FIFO construction several parameters can be specified such as: the depth (number of entries), width (number of references per entry), overflow control model (e.g., overwrite an existing entry or block anew entry), etc. Each shared memory buffer FIFO maintains one or more of: an access mutex to protect head and tail pointers of the FIFO; read and write counting semaphores; performance metrics; and an array of entries. In this illustration, array of references 553 contains shared object reference 501. In some embodiments, the array of references is a part of a buffer.

The use of the shared memory buffers, objects, etc. allows for inter-process communication (IPC) to be able to share virtually any size buffers between the device daemon 110 and tasks with zero copy, which ensures the best performance and memory usage as the tasks simply use various FIFO to access shared memory objects.

Figure 6:
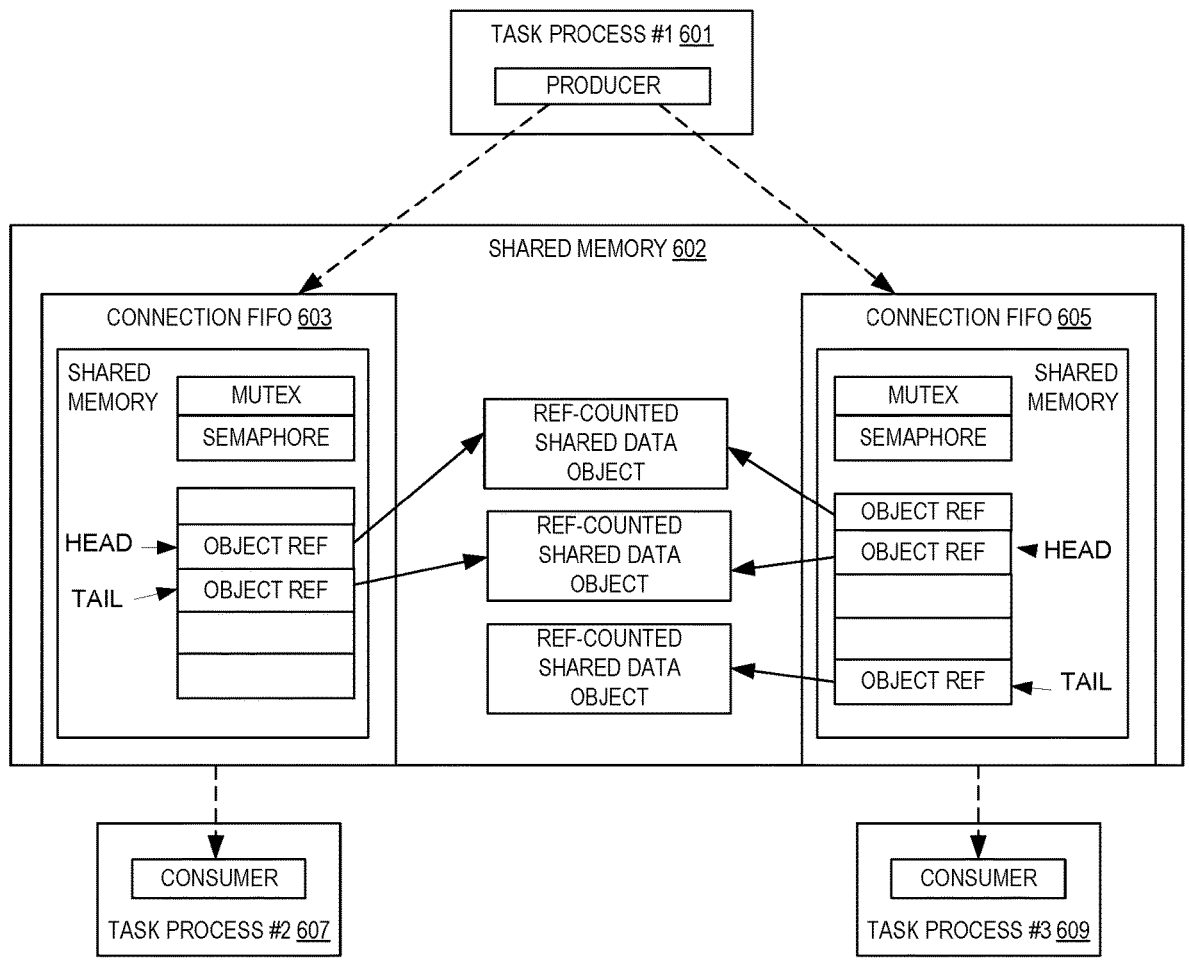
FIG. 6 illustrates an example of a task sharing data with two connection FIFOs.

FIG. 6 illustrates an example of a task sharing data with two connection FIFOs. In this example, the task process 1 601 produces output data (shown as the shared data objects in shared memory 602) that is referenced by the two connection FIFOs 603 and 605. These connection FIFOs 603 and 605 are output connection FIFOs for task process 1 601 and input connection FIFOs for task processes 607 and 609 respectively.

As shown, the connection FIFOs 603 and 605 can reference the same objects in shared memory 602 allowing their task processes to access the same objects without any sort of copying of data into one process.

Figure 7:
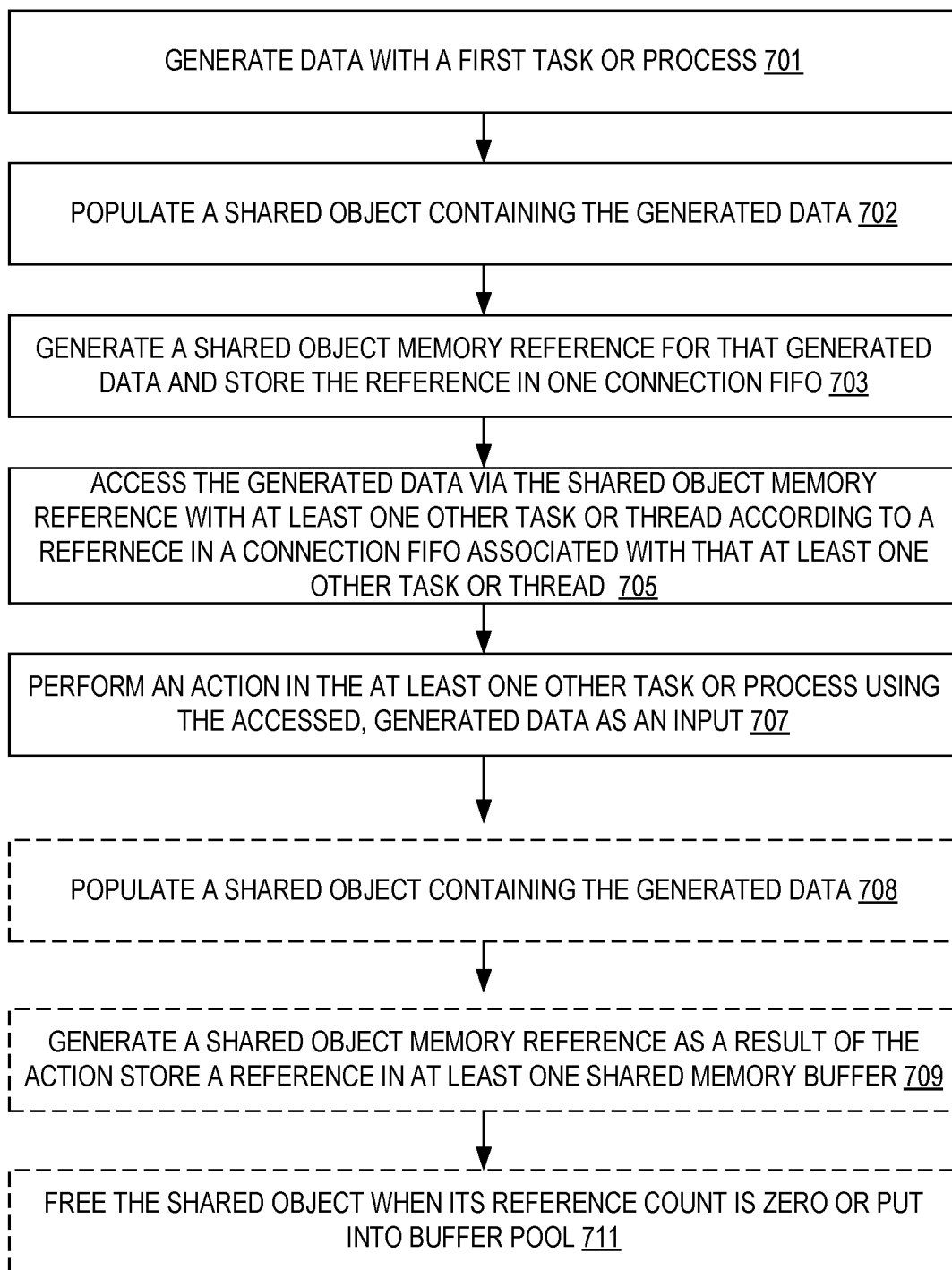
FIG. 7 is a flow diagram illustrating operations of a method for using shared memory between processes according to some embodiments.

FIG. 7 is a flow diagram illustrating operations of a method for using shared memory between processes according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

At 701, data is generated in a first process or task. For example, process A generates data to be consumed by another process.

At 702 a shared memory manager for the generating process populates the shared memory object including the population of the reference count and allocation header and stores the reference in a designated buffer. Note that in some instances to cause this generation, the process alerts the shared memory manager that there has been data generated. In other instances, a connection FIFO data structure associated with the process causes the alert.

A shared object memory reference for that generated data is generated and the reference is stored in at least one connection FIFO data structure at 703.

At 705, the generated object data is accessed via the shared memory reference by at least one other, different task or process according to a reference in the designated shared memory buffer. Note that the first and different task or process do not need be from the same program.

An action is performed in the at least one other, different task or process using the shared data of the accessed, shared object memory reference as an input at 707.

If new data has been generated that is to be shared, a shared object is populated with the new data at 708. Note that the shared object could be the existing shared object and a new offset is generated, or a different shared object could be populated.

A shared object memory reference based on that action is generated and the reference is stored in at least one shared memory buffer at 709.

At some later point in time, when the shared object's reference count is zero (all buffers that pointed to it have been freed), the shared object is freed such that the memory space may be reused or put into a buffer pool at 711.

Tasks may be written in many different programming languages. In some embodiments, each task imports a runtime library and defines a new class derived from the runtime base class. FIG. 8 illustrates an example of a task according to some embodiments. As shown, in addition to the importation and class definition, one or more functions are included including an interface function, an initialization (init) function, an entry function, and a main function.

The interface( ) function returns a dictionary of declarations of task parameters, inputs and outputs. The init( ) function is called once by the task runtime to give the task a chance to perform any initialization as necessary before entering the main loop.

FIG. 9 illustrates embodiments of the dictionary return of from the interface( ) function. All of the keys ("parameters", "inputs" and "outputs") shown are optional. If key is defined, the entries within are also optional and it can be any number of them. Inputs are what may be required for a task in processing, outputs are what the task is to produce, and parameters are what are passed to the task during initialization.

As shown, an input may be defined by a data type (e.g., Boolean, byte, unsigned integer, string, rectangle, ML model, media stream, etc.), a name, an optional description (e.g., string surrounded by quotes), and an indication of if the input is required. An output may be defined by a data type (e.g., Boolean, byte, unsigned integer, string, rectangle, ML model, media stream, etc.), a name, and an optional description (e.g., string surrounded by quotes). A parameter may be defined by a data type (e.g., Boolean, byte, unsigned integer, string, rectangle, ML model, media stream, etc.), a name, an optional description (e.g., string surrounded by quotes), and, in some instances, a default value.

The entry( ) function is called by the task runtime from the main loop when there is input data available for processing. The entry( ) function processes the input data, generates and assigns outputs as required by the particular ML model, and returns back to the main loop. The entry( ) function intakes inputs, outputs, and parameters. These defined the same as for init( ) function, with the exception that in addition to connection descriptors, entry( ) function also receives input data associated with the inputs and can set result data to the output descriptors to be forwarded to the consumers.

The main( ) function that is first called by the on-demand serverless compute daemon 130 when the task is launched. The task instantiates an instance of the task class and calls a run( ) member function which is implemented in the task runtime 121, its task is to perform task initialization and enter the main loop.

FIG. 10 illustrates an example of a package definition. In this example, the package "Sample-Application" has single task name with several parameters. The types of the parameters are defined by the interface and therefore not included in this section; the structure of "value" field must correspond to whatever the type and format of the parameter is, as defined by the interface.

The inputs section of the task includes two inputs. The inputs section is an array of objects where each of the objects defines data sources for each of the inputs. Inputs are identified by their names as defined by task interface and each if the inputs are associated with an array of data source resource names, one or more. The field "name" defines the name of the task input, as declared by interface( ) task function and which data source connections are being configured. The field "source" is an array that defines one or more data source references.

FIG. 11 illustrates an example of an application definition. In this example, the package "Sample-Application" has single task name with several parameters. The types of the parameters are defined by the interface and therefore not included in this section; the structure of "value" field must correspond to whatever the type and format of the parameter is, as defined by the interface.

The inputs section of the task includes two inputs. The inputs section is an array of objects where each of the objects defines data sources for each of the inputs. Inputs are identified by their names as defined by task interface and each if the inputs are associated with an array of data source resource names, one or more. The field "name" defines the name of the task input, as declared by interface( ) task function and which data source connections are being configured. The field "source" is an array that defines one or more data source references.

FIGS. 12-14 illustrate aspects of an exemplary task code. In particular, the task is facial recognition. As shown in FIG. 12, calling the defined interface( ) function will return the parameters, inputs, and outputs as shown. The defined into function is used to load models from specified directories, defines inputs and outputs, and sets up handlers to call after using the models.

FIG. 13 shows an example of a definition of an entry( ) function which shows how to process the input data. FIG. 14 shows examples of defining what to do with the results of the various models and a conversion of bounding boxes into rectangles. Additionally, a definition of the main( ) function is provided indicating what to return upon task completion.

Figure 15:
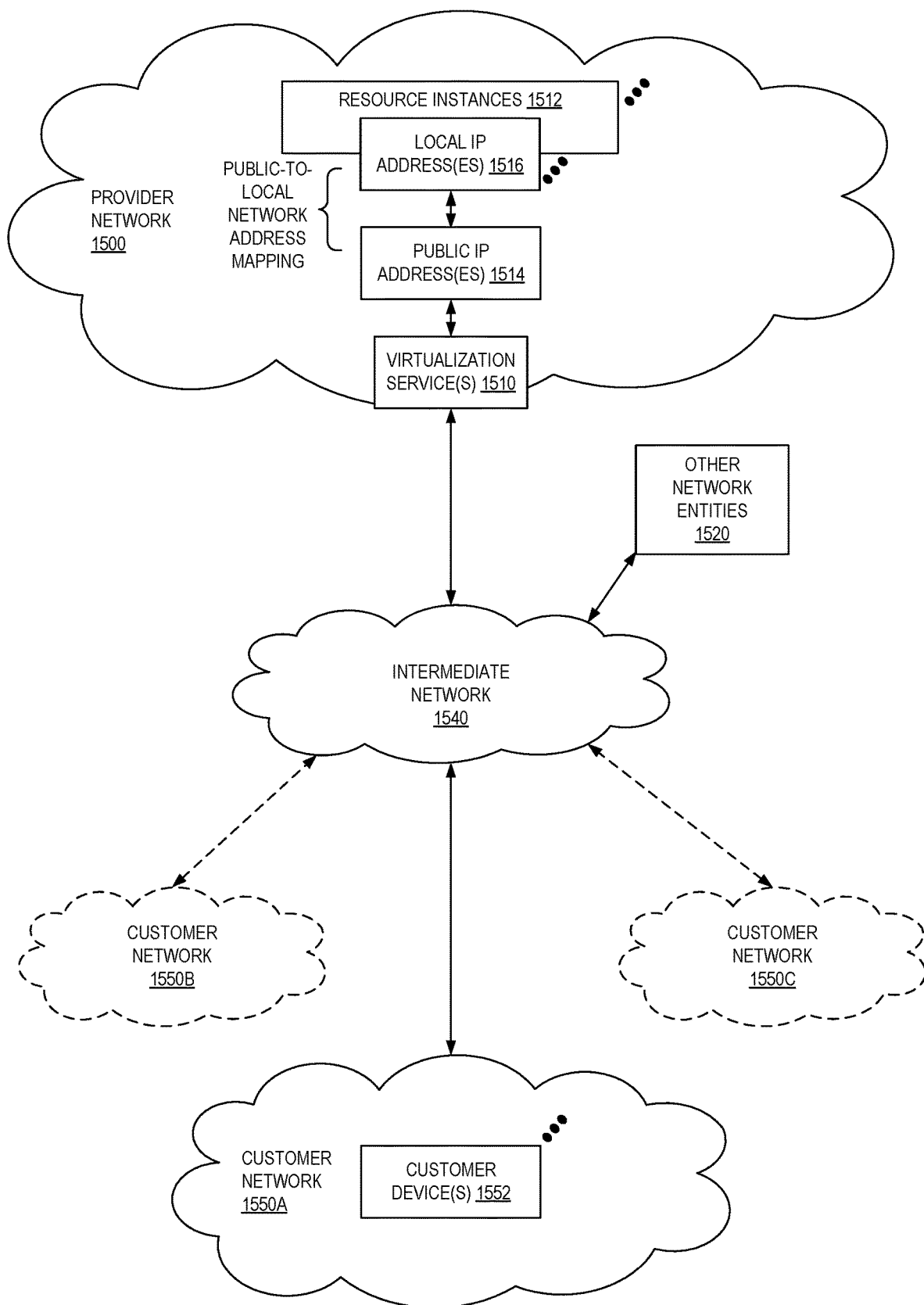
FIG. 15 illustrates an example provider network environment according to some embodiments.

FIG. 15 illustrates an example provider network (or "service provider system") environment according to some embodiments. A provider network 1500 may provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 may be associated with the resource instances 1512; the local IP addresses are the internal network addresses of the resource instances 1512 on the provider network 1500. In some embodiments, the provider network 1500 may also provide public IP addresses 1514 and/or public IP address ranges (e.g., Internet Protocol version 4 (IPv4) or Internet Protocol version 6 (IPv6) addresses) that customers may obtain from the provider 1500.

Conventionally, the provider network 1500, via the virtualization services 1510, may allow a customer of the service provider (e.g., a customer that operates one or more client networks 1550A-1550C including one or more customer device(s) 1552) to dynamically associate at least some public IP addresses 1514 assigned or allocated to the customer with particular resource instances 1512 assigned to the customer. The provider network 1500 may also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of customer network(s) 1550A-1550C may, for example, implement customer-specific applications and present the customer's applications on an intermediate network 1540, such as the Internet. Other network entities 1520 on the intermediate network 1540 may then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 may be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1500; a customer may then assign their allocated public IP addresses to particular resource instances allocated to the customer. These public IP addresses may be referred to as customer public IP addresses, or simply customer IP addresses. Instead of being assigned by the provider network 1500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
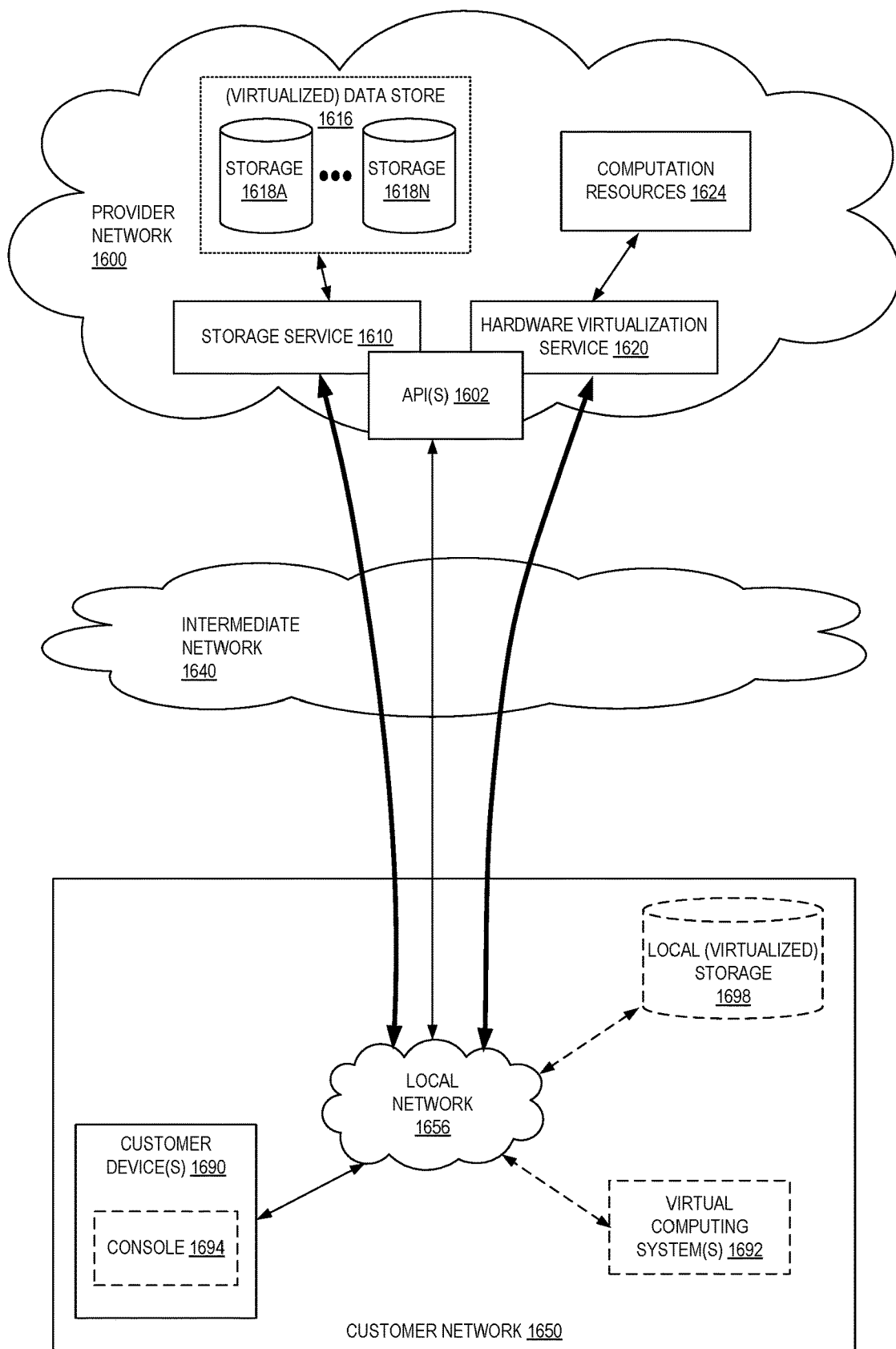
FIG. 16 is a block diagram of an example provider network that provides a storage service and a hardware virtualization service to customers according to some embodiments.

FIG. 16 is a block diagram of an example provider network that provides a storage service and a hardware virtualization service to customers, according to some embodiments. Hardware virtualization service 1620 provides multiple computation resources 1624 (e.g., VMs) to customers. The computation resources 1624 may, for example, be rented or leased to customers of the provider network 1600 (e.g., to a customer that implements customer network 1650). Each computation resource 1624 may be provided with one or more local IP addresses. Provider network 1600 may be configured to route packets from the local IP addresses of the computation resources 1624 to public Internet destinations, and from public Internet sources to the local IP addresses of computation resources 1624.

Provider network 1600 may provide a customer network 1650, for example coupled to intermediate network 1640 via local network 1656, the ability to implement virtual computing systems 1692 via hardware virtualization service 1620 coupled to intermediate network 1640 and to provider network 1600. In some embodiments, hardware virtualization service 1620 may provide one or more APIs 1602, for example a web services interface, via which a customer network 1650 may access functionality provided by the hardware virtualization service 1620, for example via a console 1694 (e.g., a web-based application, standalone application, mobile application, etc.). In some embodiments, at the provider network 1600, each virtual computing system 1692 at customer network 1650 may correspond to a computation resource 1624 that is leased, rented, or otherwise provided to customer network 1650.

From an instance of a virtual computing system 1692 and/or another customer device 1690 (e.g., via console 1694), the customer may access the functionality of storage service 1610, for example via one or more APIs 1602, to access data from and store data to storage resources 1618A-1618N of a virtual data store 1616 (e.g., a folder or "bucket", a virtualized volume, a database, etc.) provided by the provider network 1600. In some embodiments, a virtualized data store gateway (not shown) may be provided at the customer network 1650 that may locally cache at least some data, for example frequently-accessed or critical data, and that may communicate with storage service 1610 via one or more communications channels to upload new or modified data from a local cache so that the primary store of data (virtualized data store 1616) is maintained. In some embodiments, a user, via a virtual computing system 1692 and/or on another customer device 1690, may mount and access virtual data store 1616 volumes via storage service 1610 acting as a storage virtualization service, and these volumes may appear to the user as local (virtualized) storage 1698.

While not shown in FIG. 16, the virtualization service(s) may also be accessed from resource instances within the provider network 1600 via API(s) 1602. For example, a customer, appliance service provider, or other entity may access a virtualization service from within a respective virtual network on the provider network 1600 via an API 1602 to request allocation of one or more resource instances within the virtual network or within another virtual network.

Illustrative Systems

Figure 17:
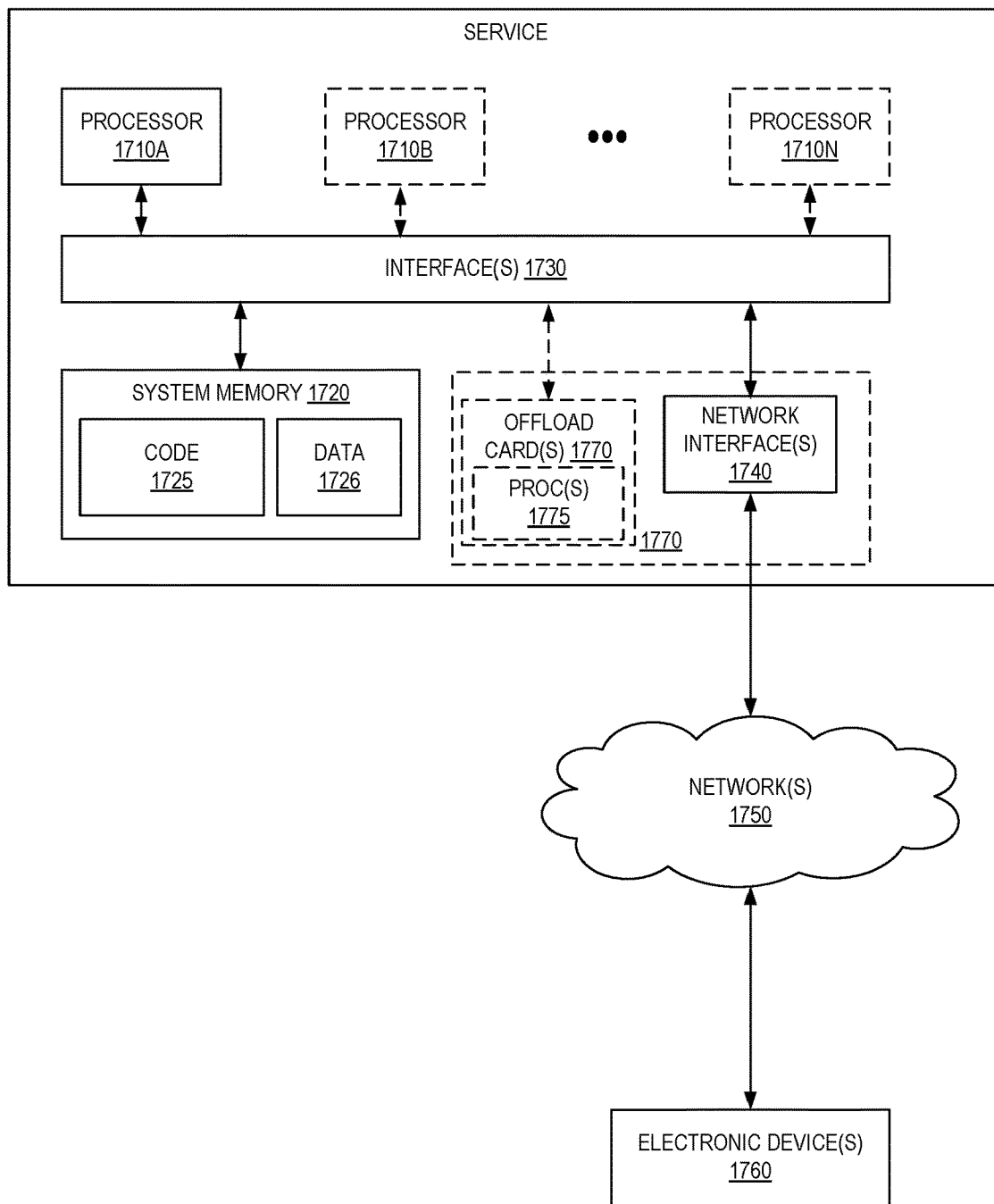
FIG. 17 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1700 illustrated in FIG. 17. In the illustrated embodiment, computer system 1700 includes one or more processors 1710 coupled to a system memory 1720 via an input/output (I/O) interface 1730. Computer system 1700 further includes a network interface 1740 coupled to I/O interface 1730. While FIG. 17 shows computer system 1700 as a single computing device, in various embodiments a computer system 1700 may include one computing device or any number of computing devices configured to work together as a single computer system 1700.

In various embodiments, computer system 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1710 may commonly, but not necessarily, implement the same ISA.

System memory 1720 may store instructions and data accessible by processor(s) 1710. In various embodiments, system memory 1720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1720 as code 1725 and data 1726.

In one embodiment, I/O interface 1730 may be configured to coordinate I/O traffic between processor 1710, system memory 1720, and any peripheral devices in the device, including network interface 1740 or other peripheral interfaces. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices 1760 attached to a network or networks 1750, such as other computer systems or devices as illustrated in FIG. 1, for example. In various embodiments, network interface 1740 may support communication via any suitable wired or wireless general data networks, such as types of Ethernet network, for example. Additionally, network interface 1740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1700 includes one or more offload cards 1770 (including one or more processors 1775, and possibly including the one or more network interfaces 1740) that are connected using an I/O interface 1730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1700 may act as a host electronic device (e.g., operating as part of a hardware virtualization service) that hosts compute instances, and the one or more offload cards 1770 execute a virtualization manager that can manage compute instances that execute on the host electronic device. As an example, in some embodiments the offload card(s) 1770 can perform compute instance management operations such as pausing and/or un-pausing compute instances, launching and/or terminating compute instances, performing memory transfer/copying operations, etc. These management operations may, in some embodiments, be performed by the offload card(s) 1770 in coordination with a hypervisor (e.g., upon a request from a hypervisor) that is executed by the other processors 1710A-1710N of the computer system 1700. However, in some embodiments the virtualization manager implemented by the offload card(s) 1770 can accommodate requests from other entities (e.g., from compute instances themselves), and may not coordinate with (or service) any separate hypervisor.

In some embodiments, system memory 1720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1700 via I/O interface 1730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1700 as system memory 1720 or another type of memory. Further, a computer-accessible medium may include transmission media or signals such as electrical, electromagnetic, or digital signals, conveyed via a communication medium such as a network and/or a wireless link, such as may be implemented via network interface 1740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1618A-1618N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   deploying one or more on-demand serverless applications to a serverless computer daemon of an edge device, using a provider network service;
   launching each of the one or more deployed, on-demand serverless applications with its own, independent runtime;
   using a device daemon of the edge device to:
     register the one or more launched on-demand serverless applications,
     read a deployment configuration for an application using the one or more launched on-demand serverless applications,
     based on the read deployment configuration, launch one or more data sources and one or more data sinks,
     for each launched data source, register the launched data source with the device daemon,
     for each launched data sink, register the launched data sink with the device daemon,
     match registered, launched data sources with registered, launched data sinks and launched on-demand serverless applications as defined in the deployment configuration,
     for each match, register a connection first in, first out (FIFO) data structure to be used to share data on an event driven basis between ones of the launched on-demand serverless applications; and
     execute the application using at least one of the connection FIFO data structures.

2. The computer-implemented method of claim 1, wherein the registration of a data sink or a data source includes sending its name, associated outputs, and output parameters.

3. The computer-implemented method of claim 1, wherein at least one of the one or more on-demand serverless applications acts as both a data sink and a data source.

4. A computer-implemented method comprising:
   launching one or more deployed, on-demand serverless applications with its own, independent runtime;
   registering the one or more launched on-demand serverless applications;
   launching one or more data sources and one or more data sinks as dictated by a deployment configuration for an application;
   for each launched data source, registering the launched data source;
   for each launched data sink, registering the launched data sink;
   matching registered, launched data sources with registered, launched data sinks and launched on-demand serverless applications as defined in the deployment configuration;
   for each match, registering a connection first in, first out (FIFO) data structure to be used to share data on an event driven basis between launched on-demand serverless applications; and
   executing the application using at least one of the connection FIFO data structures.

5. The computer-implemented method of claim 4, wherein the registration of a data sink or a data source includes sending its name, associated outputs, and output parameters.

6. The computer-implemented method of claim 4, wherein each connection FIFO data structure comprises one or more shared object reference pointers in an array.

7. The computer-implemented method of claim 4, wherein the registration is performed by a daemon that provides runtime support for launched on-demand serverless applications.

8. The computer-implemented method of claim 7, wherein the application and the deployment configuration are a part of a deployment package.

9. The computer-implemented method of claim 4, wherein each independent runtime is a part of a container.

10. The computer-implemented method of claim 4, wherein each independent runtime provides at least one of the one or more on-demand serverless applications with at least one of:
    an ability to connect its inputs to data sources;
    an ability to announce and provide its outputs to consumers;
    an ability to wait for and act upon incoming data;
    an ability to collect produced results and provide them to consumers; and
    an ability to manipulate images, load models, and run inferences.

11. The computer-implemented method of claim 4, further comprising:
    storing, by a first on-demand serverless application of the application, a result that is referenced by a first connection FIFO data structure; and
    reading, by a second on-demand serverless application of the application, the result that is referenced by the first connection FIFO data structure, wherein the first connection FIFO data structure is stored in a memory shared between the first and second on-demand serverless applications.

12. The computer-implemented method of claim 4, further comprising:
    starting a collector thread to monitor at least one connection FIFO data structure for data.

13. The computer-implemented method of claim 12, further comprising:
    upon the collector thread determining there is enough collected data referenced in the connection FIFO data structure, waking a main thread to execute one of the on-demand serverless applications.

14. The computer-implemented method of claim 4, wherein at least one of the one or more data sources is one of:
    a media stream, a sensor, a messaging device, and a database.

15. A system comprising:
    an deployment service implemented by a first one or more electronic devices to deploy an application to an edge device; and
    the edge device, the edge device including instructions that upon execution cause a device daemon of the edge device to:
        launch one or more on-demand serverless applications of the application;
        register the one or more launched on-demand serverless applications,
        read a deployment configuration for the application,
        based on the read deployment configuration, launch one or more data sources and one or more data sinks,
        for each launched data source, register the launched data source with the device daemon,
        for each launched data sink, register the launched data sink with the device daemon,
        match registered, launched data sources with registered, launched data sinks and launched on-demand serverless applications as defined in the deployment configuration, and
        for each match, register a connection first in, first out (FIFO) data structure to be used to share data on an event driven basis between ones of the launched on-demand serverless applications.

16. The system of claim 15, wherein the registration of a data sink or a data source includes sending its name, associated outputs, and output parameters.

17. The system of claim 15, wherein each connection FIFO data structure comprises one or more shared object reference pointers in an array.

18. The system of claim 15, wherein the application and the deployment configuration are a part of a deployment package.

19. The system of claim 15, wherein each of the one or more on-demand serverless applications is launched with its own independent runtime, wherein each independent runtime provides the corresponding on-demand serverless application at least one of:
    an ability to connect its inputs to data sources;
    an ability to announce and provide its outputs to consumers;
    an ability to wait for and act upon incoming data;
    an ability to collect produced results and provide them to consumers; and
    an ability to manipulate images, load models, and run inferences.

20. The system of claim 15, wherein at least one of the one or more data sources is one of:
    a media stream, a sensor, a messaging device, and a database.

* * * * *